United States Patent [19]

Closs et al.

[11] Patent Number: 5,445,672
[45] Date of Patent: Aug. 29, 1995

[54] LAKED TRIS- OR TETRACATIONIC POLYMETHINE DYES

[75] Inventors: Friedrich Closs, Frankenthal; Bernhard Albert, Maxdorf; Henning Wienand, Neulussheim, all of Germany

[73] Assignee: BASF Aktiengesellschaft, Ludwigshafen, Germany

[21] Appl. No.: 224,297

[22] Filed: Apr. 7, 1994

[30] Foreign Application Priority Data

Apr. 8, 1993 [DE] Germany .................. 43 11 723.6
Aug. 11, 1993 [DE] Germany .................. 43 26 889.7

[51] Int. Cl.⁶ ................................................. C09B 63/00
[52] U.S. Cl. ................................... 106/402; 106/21 R; 106/234; 106/498
[58] Field of Search ............... 106/402, 21 R, 23 H, 106/498

[56] References Cited

U.S. PATENT DOCUMENTS 2,140,248 12/1938 Retter et al. .................. 106/402
5,250,207 10/1993 Kormann et al. .............. 252/62.54

FOREIGN PATENT DOCUMENTS

4021078A1 1/1992 Germany .
4115608A1 11/1992 Germany .

OTHER PUBLICATIONS

Heathcock, Clayton H., The Journal of Organic Chemistry, vol. 57, 1992, Issues 14–18, pp. 4578–4580 No month.

*Primary Examiner*—Mark L. Bell
*Assistant Examiner*—Scott L. Hertzog
*Attorney, Agent, or Firm*—Oblon, Spivak, McClelland, Maier, & Neustadt

[57] ABSTRACT

In laked tris- or tetracationic polymethine dyes I

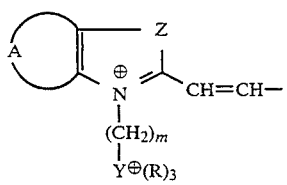

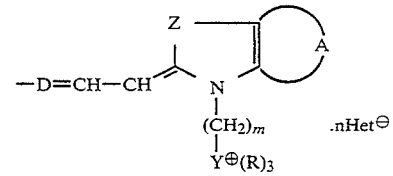

the variables have the following meanings:
A is the radical of a fused-on substituted or unsubstituted benzene or naphthalene nucleus,
Y is nitrogen or phosphorus,
Z is $-NR^1-$, $-O-$, $-S-$, $-C(CH_3)_2-$ or $-CH=CH-$, where $R^1$ is a radical as defined for R,
D is $-CX^1=$, $-CH=CX^1-CH=$,

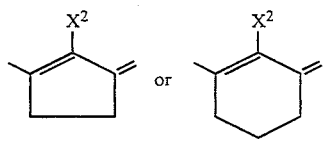

Het$^\ominus$ is the equivalent of a heteropolyacid anion,
m is from 1 to 10, and
n is 3 or 4, where $(R)_3$, $X^1$, and $X^2$ have the meanings set out in the specification.

5 Claims, No Drawings

LAKED TRIS- OR TETRACATIONIC POLYMETHINE DYES

The present invention relates to novel laked tris- or tetracationic polymethine dyes of the general formula I

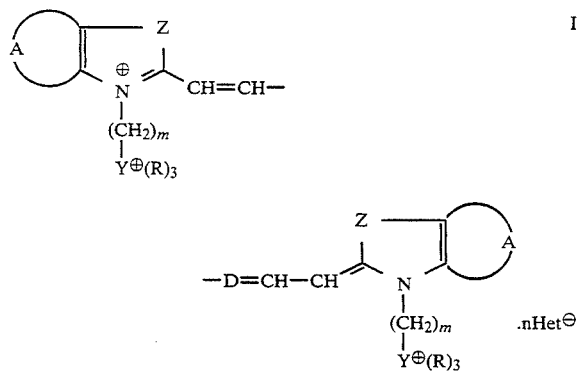

where the variables have the following meanings:

A is the radical of a fused-on benzene or naphthalene nucleus, which may carry up to three of the following substituents: $C_1$–$C_{12}$-alkyl groups, whose carbon chain may be interrupted by oxygen atoms in ether function, $C_1$–$C_{12}$-alkoxy, phenyl, phenoxy, phenylthio, cyano, amino, mono($C_1$–$C_{12}$-alkyl)amino, di($C_1$–$C_{12}$-alkyl)amino, hydroxyl or halogen, Y is nitrogen or phosphorus, (R)$_3$ is three identical or different members of the following set of radicals: $C_1$–$C_{18}$-alkyl groups, whose carbon chain may be interrupted by oxygen atoms in ether function and which may carry up to three of the following substituents: carboxyl, $C_1$–$C_4$-alkanoyl, $C_1$–$C_4$-alkoxycarbonyl, $C_1$–$C_4$-alkanoylamino, $C_1$–$C_4$-alkoxycarbonylamino, acryloyloxy, methacryloyloxy, phenyl, amino, cyano, hydroxyl or halogen, and phenyl or $C_5$–$C_7$-cycloalkyl groups, which may each carry up to three of the following substituents: $C_1$–$C_4$-alkyl, $C_1$–$C_4$-alkoxy or halogen, Z is —NR$^1$—, —O—, —S—, —C(CH$_3$)$_2$— or —CH=CH—, where R$^1$ is an alkyl, phenyl or $C_5$–$C_7$-cycloalkyl radical as defined for R, D is —CX$^1$=, —CH=CX$^1$—CH=,

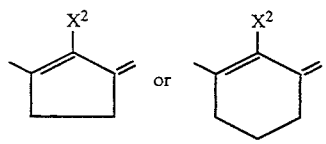

where the variables have the following meanings:

X$^1$ is hydrogen, chlorine, bromine or $C_1$–$C_6$-alkyl,

X$^2$ is chlorine, cyano, $C_1$–$C_{12}$-alkoxy or $C_1$–$C_{12}$-alkylthio; aryloxy or arylthio, which may each carry up to five of the following substituents: amino, halogen, nitro, cyano, isocyanato, isothiocyanato, hydroxyl, carboxyl, acryloyloxy, methacryloyloxy, $C_1$–$C_{12}$-alkyl, $C_2$–$C_{12}$-alkenyl, $C_1$–$C_{12}$-alkoxy, $C_1$–$C_{12}$-alkanoyl, $C_1$–$C_{12}$-alkanoyloxy, $C_1$–$C_{12}$-alkoxycarbonyl, $C_1$–$C_{12}$-alkoxycarbonyloxy, mono($C_1$–$C_{12}$-alkyl)amino or di($C_1$–$C_{12}$-alkyl)amino, wherein the carbon chain of the alkyl radicals may be interrupted by oxygen atoms in ether function and the alkyl radicals of the amino groups may be substituted by hydroxyl;

an amino group

or ammonio group

where R$^2$, R$^3$ and R$^4$ are independently of one another $C_1$–$C_{12}$-alkyl, whose carbon chain may be interrupted by oxygen atoms in ether function, or aryl, one of the radicals may in each case also be hydrogen, and R$^2$ and R$^3$ may also be joined together to form a 5- or 6-membered ring containing the nitrogen atom with or without further heteroatoms, Het$^e$ is the equivalent of a heteropolyacid anion, m is from 1 to 10, and n is 3 or 4.

The invention also relates to the use of these laked polymethine dyes for pigmenting paints, printing inks and plastics and to printing inks containing these pigments.

Modern communication technology depends increasingly on the safe and rapid input of information. Of foremost importance is the automatic, digital reading of information in printed digital or analog form. An example are printed bar codes which can be sensed and read with suitable light sources and detectors.

Of particular interest in this context are colorants which absorb in the infrared region and have little or no absorption in the visible region. These colorants can be used not only for the printing of packages in general but in particular for the printing of valuable documents, which for the purposes of the present invention covers the sector of securities, share certificates, security prints of any kind and in addition identity cards, rail and air tickets, lottery tickets, and security features on labels and entitlement certificates of any kind.

The colorants used for these purposes have to meet a number of different requirements depending on the use. Essential are in general high lightfastness, narrowband IR absorption, and good transparency in the visible region.

IR-absorbing colorants include for example polymethine dyes. However, their lightfastness is generally not sufficient for the applications mentioned. True, it is known that the lightfastness of polymethines can be increased by laking with heteropolyacids (US-A-2 140 248), but the laking of IR-absorbing polymethines produces only extremely weak pigment powders having little if any absorption in the infrared region.

It is an object of the present invention to provide colorants which meet the stated requirements and which have in particular good application properties.

We have found that this object is achieved by the laked tris- or tetracationic polymethine dyes I defined at the beginning.

The invention also provides for their use for pigmenting paints, printing inks and plastics.

The invention further provides printing inks containing these compounds I.

Preferred embodiments of the invention are recited in the subclaims.

The group A is the radical of a fused-on naphthalene nucleus and preferably that of a fused-on benzene nucleus with in each case the unsubstituted radicals and the chlorine-monosubstituted radicals being preferred.

When A is a substituted radical, suitable substituents are:

$C_1$–$C_{12}$-alkyl groups such as heptyl, octyl, 2-ethylhexyl, nonyl, decyl, undecyl and dodecyl and also branched radicals of this kind and in particular $C_1$–$C_6$-alkyl groups such as methyl, ethyl, propyl, isopropyl, butyl, isobutyl, sec-butyl, tert-butyl, pentyl, isopentyl, neopentyl, tert-pentyl, hexyl and 2-methylpentyl, $C_1$–$C_{12}$-alkyl groups whose carbon chain is interrupted by oxygen atoms in ether function, such as 2-methoxy-, 2-ethoxy-, 2-propoxy-, 2-isopropoxy- and 2-butoxyethyl, 2- and 3-methoxypropyl, 2- and 3-ethoxypropyl, 2- and 4-ethoxybutyl, 2- and 4-isopropoxybutyl, 5-ethoxypentyl, 6-methoxyhexyl, 4-oxa-6-ethyldecyl, 3,6-dioxaheptyl, 3,6-dioxaoctyl, 3,6-dioxadecyl, 3,6,9-trioxadecyl and 3,6,8-trioxaundecyl, $C_1$–$C_{12}$-alkoxy groups such as heptyloxy, octyloxy, 2-ethylhexyloxy, nonyloxy, decyloxy, undecyloxy, dodecyloxy and in particular $C_1$–$C_6$-alkoxy groups such as methoxy, ethoxy, propoxy, isopropoxy, butoxy, isobutoxy, sec-butoxy, pentyloxy, isopentyloxy, neopentyloxy and hexyloxy, mono- and di($C_1$–$C_{12}$-alkyl)amino groups such as pentyl-, hexyl-, heptyl- and 2-ethylhexyl-amino and also dipentyl- and dihexyl-amino and in particular mono- and di($C_1$–$C_4$-alkyl)amino groups such as methyl-, ethyl-, propyl-, isopropyl- and butyl-amino and also dimethyl-, methylethyl-, diethyl- and diisopropyl-amino, phenoxy, phenylthio and in particular phenyl, cyano, hydroxyl, amino, halogen such as fluorine, in particular bromine and especially chlorine.

Y is phosphorus and preferably nitrogen.

The R radicals can be identical or different, they are preferably identical.

$C_1$–$C_{18}$-Alkyl R is preferably $C_1$–$C_{12}$-alkyl or -oxaalkyl as mentioned above as substituents for the group A, particularly preferably alkyl and oxaalkyl with up to 4 carbon atoms, very particularly preferably methyl and ethyl.

R may further be for example one of the following alkyl groups: tridecyl, tetradecyl, pentadecyl, hexadecyl, heptadecyl, octadecyl, nonadecyl, eicosyl, heneicosyl and docosyl and also branched radicals of this kind.

When the carbon chain of the alkyl groups is interrupted by oxygen atoms in ether function, the number of chain members increases by the number of these oxygen atoms. The number of oxygen atoms in the chain is preferably one or two in the case of $C_1$–$C_6$-alkyl groups, up to three in the case of $C_7$–$C_{12}$-alkyl groups and up to five in the case of $C_{13}$–$C_{22}$-alkyl groups. Examples of these groups are the radicals already mentioned as substituents for A.

Alkyl R can have up to three substituents, preferably up to two. Examples of substituted alkyl are the following radicals:

preferably carboxyalkyl such as in particular carboxymethyl and 2-carboxyethyl and also 3-carboxypropyl, 4-carboxybutyl and 5-carboxypentyl, $C_1$–$C_4$-alkanoylalkyl such as propan-2-on-1-yl, butan-3-on-1-yl, butan-3-on-2-yl and 2-ethylpentan-3-on-1-yl, preferably $C_1$–$C_4$-alkoxycarbonylalkyl such as in particular ethoxycarbonylmethyl, 2-(ethoxycarbonyl)ethyl and 2-(octyloxycarbonyl)ethyl and also 2- and 3-(methoxycarbonyl)propyl and 3-(isopropoxycarbonyl)propyl, $C_1$–$C_4$-alkanoylaminoalkyl such as acetylaminomethyl, 2-(acetylamino)ethyl, 2-(propionylamino)ethyl and 2-(butyrylamino)ethyl, $C_1$–$C_4$-alkoxycarbonylaminoalkyl such as ethoxycarbonylaminomethyl and 2-(ethoxycarbonylamino)ethyl, particularly acryloyloxyalkyl and methacryloyloxyalkyl such as 2-acryloyloxyethyl, 2-methacryloyloxyethyl, 2- and 3-methacryloyloxypropyl, 2- and 4-methacryloyloxybutyl, phenylalkyl such as benzyl and 1- and 2-phenylethyl, preferably hydroxyalkyl such as in particular 2-hydroxyethyl and also 2- and 3-hydroxypropyl, 2- and 4-hydroxybutyl, 5-hydroxypentyl, 6-hydroxyhexyl, but also 7-hydroxyheptyl and 8-hydroxyoctyl, haloalkyl such as fluoro-, difluoro- and trifluoromethyl, 2-fluoro-, 1,1-difluoro- and 1,1,1-trifluoroethyl, heptafluoropropyl, 5-fluoropentyl, particularly chloro- and trichloro-methyl, 2-chloroethyl, 4-chlorobutyl, 6-chlorohexyl and in particular bromomethyl, 2-bromoethyl and 4-bromobutyl, cyanoalkyl such as cyanomethyl, 2-cyanoethyl, 3-cyanopropyl, 4-cyanobutyl, 5-cyanopentyl and 6-cyanohexyl, aminoalkyl such as 2-aminoethyl, 2- and 3-aminopropyl, 2- and 4-aminobutyl, 5-aminopentyl and 6-aminohexyl.

Suitable R further includes cyclopentyl, cyclohexyl and cycloheptyl and also in particular phenyl, which are each preferably unsubstituted, but may also carry up to three substituents such as the above-mentioned $C_1$–$C_4$-alkyl and $C_1$–$C_4$-alkoxy groups and halogen such as fluorine, preferably chlorine and bromine. Examples of substituted radicals of this group are 4-methyl-, 4-methoxy-, 4-chloro- and 4-bromo-phenyl and 3-methylcyclopentyl, 4-methyl-, 4-ethyl- and 2,3-dichloro-cyclohexyl.

m is generally from 1 to 10, preferably from 3 to 6.

Examples of suitable —$(CH_2)_m$—Y.$(R)_3$ are (with Ph=phenyl, Me=methyl, Et=ethyl and Bu=butyl):
—$(CH_2)_4$—N•$Et_3$, —$(CH_2)_3$—N•$Me_3$, —$(CH_2)_3$—N•$Bu_3$, —$(CH_2)_3$—N•$Ph_3$, —$(CH_2)_3$—P•$Me_3$, —$(CH_2)_3$—N•$Et_3$, —$(CH_2)_6$—N•$Et_3$, —$(CH_2)_{10}$—N•$Et_3$, —$(CH_2)_3$—P•$Et_3$ and —$(CH_2)_3$—P•$Ph_3$.

Suitable Z besides —$NR^1$— and —O— is in particular —S—, —$C(CH_3)_2$— and —CH=CH. Examples of $R^1$ are the abovementioned radicals R with the same preferences. Suitable D is —$CX^1$=, —CH=$CX^1$—CH=,

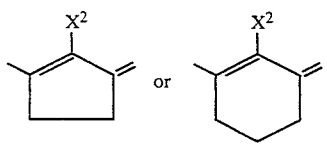

where $X^1$ is hydrogen, chlorine, bromine or one of the abovementioned $C_1$–$C_6$-alkyl radicals and $X^2$ is chlorine, cyano, one of the abovementioned $C_1$–$C_{12}$-alkoxy radicals, preferably $C_1$–$C_6$-alkoxy, or an analogous $C_1$–$C_{12}$-alkylthio radical, an aryloxy or arylthio radical or an amino or ammonio group.

Preferred D is —CH=CH—CH= and

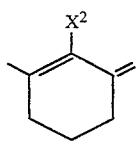

where $X^2$ is chlorine or in particular aryloxy or arylthio.

Of the aryloxy and arylthio radicals $X^2$, particularly suitable examples are α- and β-naphthyloxy and α- and β-naphthylthio and also phenoxy and phenylthio.

The aryl radicals therein may carry up to five, preferably up to two substituents.

Suitable substituents are:

amino, halogen such as chlorine and bromine, nitro, cyano, isocyanato, isothiocyanato, hydroxyl, carboxyl, acryloyloxy and methacryloyloxy;

$C_1$–$C_{12}$-alkyl, in particular $C_1$–$C_6$-alkyl, groups whose carbon chain may be interrupted by oxygen atoms in ether function; examples are listed in connection with the substituents for ring A;

$C_2$–$C_{12}$-alkenyl, in particular $C_2$–$C_6$-alkenyl, groups such as 1- and 2-propenyl, 1-, 2- and 3-butenyl, 1,3-butadienyl, 1-, 2-, 3- and 4-pentenyl, 1,3-, 1,4- and 2,4-pentadienyl and particularly vinyl;

$C_1$–$C_{12}$-alkoxy, in particular $C_1$–$C_6$-alkoxy, groups whose carbon chain may be additionally interrupted by oxygen atoms in ether function; examples are the abovementioned groups and also 2-methoxyethoxy, 2-ethoxyethoxy, 2-propoxyethoxy, 2-isopropoxyethoxy, 2-butoxyethoxy, 2- and 3-methoxypropoxy, 2- and 3-ethoxypropoxy, 2- and 3- propoxypropoxy, 2- and 3-butoxypropoxy, 2- and 4-methoxybutoxy, 2- and 4-ethoxybutoxy, 2- and 4-propoxybutoxy, 2- and 4-butoxybutoxy, 3,6-dioxaheptyloxy, 3,6-dioxaoctyloxy, 4,8-dioxanonyloxy, 3,7-dioxaoctyloxy, 3,7-dioxanonyloxy, 4,7-dioxaoctyloxy, 4,7-dioxanonyloxy, 4,8-dioxadecyloxy, 3,6,9-trioxadecyloxy and 3,6,9-trioxaundecyloxy;

$C_1$–$C_{12}$-alkanoyl, in particular $C_1$–$C_6$-alkanoyl, groups such as formyl, acetyl, propionyl and butyryl;

$C_1$–$C_{12}$-alkanoyloxy, in particular $C_1$–$C_6$-alkanoyloxy, groups such as formyloxy, acetyloxy, propionyloxy and butyryloxy;

$C_1$–$C_{12}$-alkoxycarbonyl, in particular $C_1$–$C_6$-alkoxycarbonyl, groups such as methoxycarbonyl, ethoxycarbonyl, propoxycarbonyl and butoxycarbonyl;

$C_1$–$C_{12}$-alkoxycarbonyloxy, in particular $C_1$–$C_6$-alkoxycarbonyloxy, groups such as methoxycarbonyloxy, ethoxycarbonyloxy, propoxycarbonyloxy and butoxycarbonyloxy;

mono- and di-($C_1$–$C_{12}$)alkylamino, in particular —($C_1$–$C_6$)alkylamino, groups whose carbon chain may be interrupted by oxygen atoms in ether function and which may be substituted by hydroxyl; examples are the above-recited groups and also mono- and di-(2-hydroxyethyl)amino and mono- and di-(hydroxyethyloxyethyl)amino.

Preferred substituents include for example amino, nitro, chlorine, isothiocyanato, hydroxyl, carboxyl and vinyl.

Examples of particularly preferred aryloxy and arylthio groups X are phenoxy, 2-, 3- and/or 4-amino-, -nitro-, -carboxy-, -hydroxy- and -chloro-phenoxy and 4-vinylphenoxy and also phenylthio, 4-amino- and -isothiocyanato-phenylthio and 2,4-dichlorophenylthio and also α- and β-naphthylthio.

In addition, X can also be an amino group

or ammonio group

Suitable radicals $R^2$, $R^3$, or $R^4$ are the above-mentioned $C_1$–$C_{12}$-alkyl, in particular $C_1$–$C_6$-alkyl, groups whose carbon chain may likewise be interrupted by oxygen atoms in ether function. In addition, $R^2$, $R^3$ or $R^4$ can each also be aryl, in particular phenyl.

The radicals $R_2$ and $R^3$ or $R^2$, $R^3$ and $R^4$ can be identical or different, and one of the radicals may in each case also be hydrogen.

Finally, the radicals $R^2$ and $R^3$ may form together with the nitrogen atom a saturated or unsaturated 5- or 6-membered ring which may contain further hetero atoms. Examples of these radicals X are pyrryl, pyrrolidyl, pyrazyl, imidazyl, pyrazolinyl, triazyl, piperidyl, piperazyl and morpholinyl.

Suitable heteropolyacid anions are in particular those based on molybdenum, tungsten and/or vanadium. Preferred examples are molybdato-, vanadato- and tungstophosphate and molybdato-, vanadato- and tungsto-silicate and also mixed anions of this kind.

A triply charged heteropolyacid anion will confer on a laked triscationic polymethine dye a cation/anion ratio of 1:1, while a quadruply charged anion will accordingly produce a molar ratio of 1.33:1. The corresponding cation/anion ratios for a laked tetracationic polymethine dye (X here corresponds to an ammonio group) will be 1:1.33 and 1:1 respectively.

As is well known, the preparation of these heteropolyacids and their salts can be effected by acidifying solutions of the alkali or ammonium molybdates, vanadates and/or tungstates in the presence of water-soluble phosphates and/or silicates. The heteropolyacids are also commercially available (e.g. from Merck, Darmstadt, and Fluka, Neu-Ulm).

The unlaked tris- or tetracationic polymethine dyes of the formula Ia

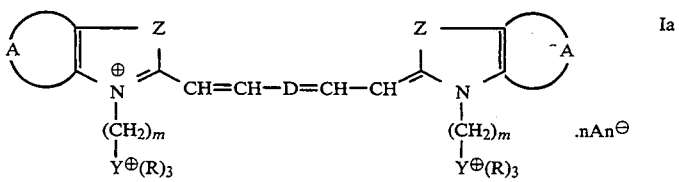

Ia where $An^e$ is preferably halide, in particular chloride and especially bromide, or acetate, can be prepared as described in DE-A-40 21 078 and the references mentioned therein (Houben-Weyl, 4th edition, Vol. V/1d, (1972) pp. 268–273).

An example of a possible method is to condense a compound of the formula II

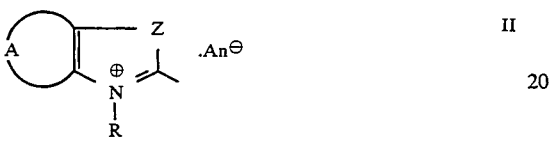

II with one of the compounds of the formulae IIIa–IIIe

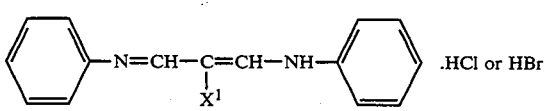

IIIa

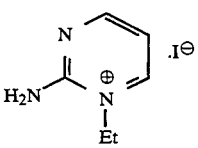

IIIb

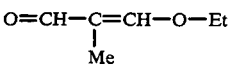

IIIc

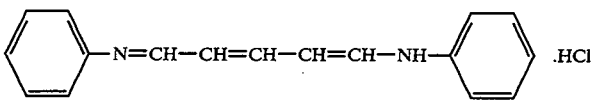

IIId

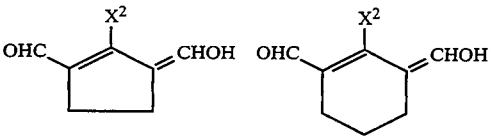

IIIe which contain the radical D in the form of the following groups:
IIIa: —$CX^{1'}$, IIIb: —CH=, IIIc: —$C(CH_3)$=, IIId: —CH=CH—CH=,

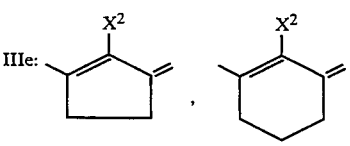

IIIe:

in a molar ratio of about 2:1.

The polymethine dyes Ia in which $X^2$ is an aromatic or nitrogen-containing radical are preferably prepared from corresponding dyes in which $X^2$ is halogen, in particular chlorine, by nucleophilic exchange of the halogen atom for the group $X^2$ in the presence of a base.

This type of reaction has been described for monocationic polymethines in Journal of Organic Chemistry 57 (1992), 4578–4580. This exchange can be effectuated in water, so that the laking of the polymethine dyes Ia, i.e. their conversion into pigment form, can take place without intermediate isolation directly in the as-obtained reaction solution.

The condensation of the compounds II with the compounds III is usefully carried out in a solvent such as methanol, propanol, butanol and glacial acetic acid, preferably acetic anhydride and ethanol, or in mixtures thereof, preferably in the presence of a base such as triethylamine, pyridine, piperidine or sodium acetate as catalyst at from 40° to 140° C., in particular at from 80° to 120° C.

The quaternary salts II required as starting materials for this synthesis are preparable, as known for example from J. Heterocyclic Chem. 22 (1985), 1727–34, by reacting a compound of the formula IV

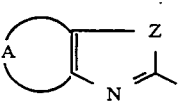

IV with a compound of the formula V

Hal—$(CH_2)_m$—$Y^{\oplus}(R)^3$ where Hal is chlorine or bromine.

The laking of the triscationic polymethine dyes, i.e. their conversion into pigments, can be effected by customary methods, for example by admixing aqueous solutions of the dyes at from about 20° to 100° C. with aqueous solutions of salts of the heteropolyacids, adjusting the pH of the mixture with an acid such as hydrochloric acid or acetic acid to generally from about 0 to 5, preferably from 0 to 2, and then subsequently stirring at the chosen temperature, generally for from 0.5 to 5 h. The pigments precipitated in this way can subsequently be isolated by filtration, washing and drying.

The laked tris- or tetracationic polymethine dyes I of the invention surprisingly have altogether favorable application properties compared with laked mono- or dicationic polymethine dyes in that they have not only a high lightfastness but also a strong, narrowband absorption in the near infrared region at wavelengths from about 700 to 1000 nm coupled with good transparency in the visible region. Moreover, they are generally obtained in an amorphous, very finely divided form and because of their soft texture are readily dispersible in application media.

The color lakes I of the invention are therefore very useful for a multiplicity of applications such as the pigmenting of plastics and paints and in particular for preparing printing inks which for the purposes of the present invention include in particular inks for the inkjet process, in which, as described for example in DE-A-4 115 608, the color lakes I can be used as aqueous or alcoholic dispersions.

EXAMPLES

Preparation of laked triscationic polymethine dyes I according to the invention

First the directions of DE-A-4 021 978 (Examples 15, 3 and 1) were followed to prepare the unlaked triscationic polymethine dyes Ia

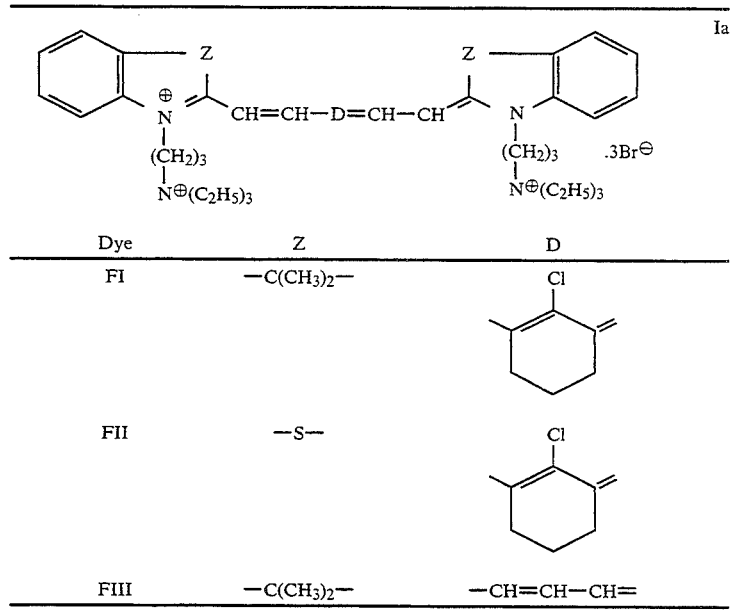

as described below (Examples 1 to 4)

The dyes FI to FIII were then reacted as described below (Examples 1 to 4) with solutions of heteropolyacids to form the color lakes I

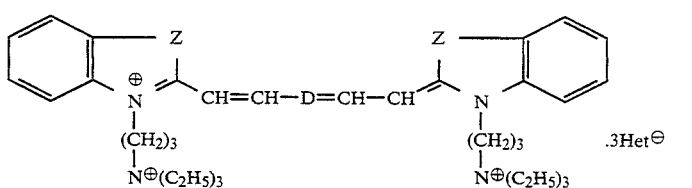

To determine the absorption maxima, the color lakes I were dispersed in toluene and a customary binder and knife-coated onto a transparent film of polyacetate.

EXAMPLE 1

Z: —C(CH$_3$)$_2$—;

D: 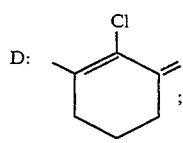;

Het$^-$:PMo$_{12}$O$_{40}$$^{3-}$

To a solution of 114 g of the dye FI in 1500 ml of water were added at 80° C. 3 l of a 0.04 molar aqueous solution of molybdatophosphoric acid (prepared from 353 g of molybdenum trioxide, 33 g of disodium hydrogenphosphate and 5200 g of water and adjusted to pH 1.8 with 18.6% strength by weight hydrochloric acid).

After stirring at 90° C. for three hours and subsequently cooling down to 70° C., the resulting precipitate was filtered off, washed with water and dried at 80° C. to leave 237 g of a dark green pigment powder of $\lambda_{max}$=815 nm.

EXAMPLE 2

Z: —C(CH₃)₂—;

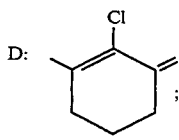

Het⁻: SiW₁₂O₄₀⁴⁻

To a solution of 9.8 g of the dye FI in 200 ml of water was added at 70° C. a solution of 21.6 g of tungstosilicic acid in 80 ml of water.

After stirring at 90° C. for one hour the mixture was worked up as described in Example 1 to leave 24.5 g of a deep green pigment powder of $\lambda_{max}$=780 nm.

EXAMPLE 3

Z: —S—;

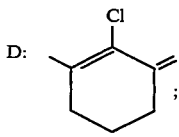

Het⁻: PMo₁₂O₄₀³⁻

To a solution of 10 g of the dye FII in 100 ml of water was added at 70° C. a solution of 18.2 g of molybdatophosphoric acid in 20 ml of water.

After stirring at 70° C. for two hours, the resulting precipitate was filtered off, washed and dried to leave 15 g of a bluish green pigment powder of $\lambda_{max}$=850 nm.

EXAMPLE 4

Z: —C(CH₃)₂—; D: —CH=CH—CH=; Het⁻: PMo₁₂O₄₀³⁻

To a solution of 4.5 g of the dye FIII in 100 ml of water was added at 70° C. a solution of 9.7 g of molybdatophosphoric acid in 30 ml of water.

After stirring at 80° C. for two hours and cooling down to 50° C. the resulting precipitate was filtered off, washed and dried to leave 10 g of a dark green pigment powder of $\lambda_{max}$=780 nm.

EXAMPLES 5 TO 9

These polymethine dyes were prepared from dye FI by nucleophilic chlorine replacement and subsequent laking with molybdatophosphoric acid.

For this x g of the dye FI were dissolved in y l of water. Then a solution of a g of the compound X-H and b g of sodium hydroxide in c ml of water was added. The solution obtained was stirred at room temperature for 15 min.

The laking was subsequently effectuated by adding d l of a 0.04 molar aqueous solution of molybdatophosphoric acid (prepared from 353 g of molybdenum trioxide, 33 g of disodium hydrogenphosphate and 5200 g of water and brought to pH 1.8 with 18.6 % strength by weight hydrochloric acid) at 70° C. and subsequent stirring at that temperature for 1 hour.

After cooling down to 50° C., the precipitate was filtered off, washed with water and dried at 50° C.

The determination of the absorption maxima was effectuated similarly to Examples 1 to 4.

Details concerning these experiments and their results are shown in the following table:

TABLE

I

| Ex. | X | x g of FI | y l of H₂O | a g of X—H | b g of NaOH | c ml of H₂O | d l of solution of PMo₁₂O₄₀³⁻ | Yield [g] | Color | $\lambda_{max}$ [nm] |
|-----|---|-----------|------------|------------|-------------|-------------|------------------------------|-----------|-------|---------------------|
| 5 | Phenylthio | 98 | 1 | 11 | 4 | 20 | 2.5 | 173 | grayish green | 830 |
| 6 | β-naphthylthio | 9.8 | 0.1 | 1.6 | 0.4 | 10 | 0.25 | 20.8 | green | 835 |
| 7 | 4-aminophenylthio | 9.8 | 0.1 | 1.25 | 0.4 | 10 | 0.25 | 20.8 | green | 865 |
| 8 | Phenoxy | 9.8 | 0.1 | 0.9 | 0.4 | 10 | 0.25 | 21.8 | green | 804 |
| 9 | 4-aminophenoxy | 9.8 | 0.1 | 1.1 | 0.4 | 10 | 0.25 | 23.6 | bluish green | 823 |

We claim:

1. Laked tris- or tetracationic polymethine dyes of the general formula I

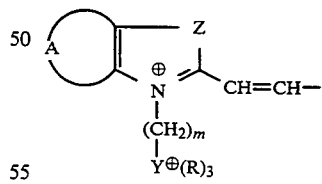

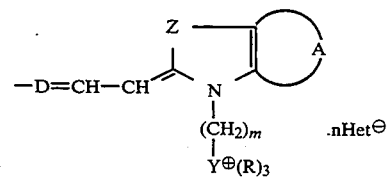

where the variables have the following meanings:

A is the radical of a fused-on benzene or naphthalene nucleus, which may carry up to three of the following substituents: C₁-C₁₂-alkyl groups, whose carbon chain may be interrupted by oxygen atoms in ether function, $C_1$–$C_{12}$-alkoxy, phenyl, phenoxy, phenylthio, cyano, amino, mono($C_1$–$C_{12}$-alkyl)amino, di($C_1$–$C_{12}$-alkyl)amino, hydroxyl or halogen, Y is nitrogen or phosphorus, (R)$_3$ is three identical or different members of the following set of radicals: $C_1$–$C_{18}$-alkyl groups, whose carbon chain may be interrupted by oxygen atoms in ether function and which may carry up to three of the following substituents: carboxyl, $C_1$–$C_4$-alkanoyl, $C_1$–$C_4$-alkoxycarbonyl, $C_1$–$C_4$-alkanoylamino, $C_1$–$C_4$-alkoxycarbonylamino, acryloyloxy, methacryloyloxy, phenyl, amino, cyano, hydroxyl or halogen, and phenyl or $C_5$–$C_7$-cycloalkyl groups, which may each carry up to three of the following substituents: $C_1$–$C_4$-alkyl, $C_1$–$C_4$-alkoxy or halogen, Z is —NR$^1$—, —O—, —S—, —C(CH$_3$)$_2$— or —CH=CH—, where R$^1$ is an alkyl, phenyl or $C_5$–$C_7$-cycloalkyl radical as defined for R, D is —CX$^1$=, —CH=CX$^1$—CH=,

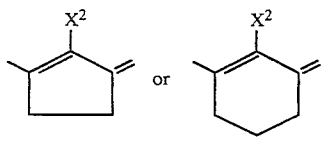

where the variables have the following meanings:

X$^1$ is hydrogen, chlorine, bromine or $C_1$–$C_6$-alkyl,

X$^2$ is chlorine, cyano, $C_1$–$C_{12}$-alkoxy or $C_1$–$C_{12}$-alkylthio; aryloxy or arylthio, which may each carry up to five of the following substituents: amino, halogen, nitro, cyano, isocyanato, isothiocyanato, hydroxyl, carboxyl, acryloyloxy, methacryloyloxy, $C_1$–$C_{12}$-alkyl, $C_2$–$C_{12}$-alkenyl, $C_1$–$C_{12}$-alkoxy, $C_1$–$C_{12}$-alkanoyl, $C_1$–$C_{12}$-alkanoyloxy, $C_1$–$C_{12}$-alkoxycarbonyl, $C_1$–$C_{12}$-alkoxycarbonyloxy, mono($C_1$–$C_{12}$-alkyl)amino or di($C_1$–$C_{12}$-alkyl)amino, wherein the carbon chain of the alkyl radicals may be interrupted by oxygen atoms in ether function and the alkyl radicals of the amino groups may be substituted by hydroxyl;

an amino group

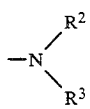

or ammonio group

where R$^2$, R$^3$ and R$^4$ are independently of one another $C_1$–$C_{12}$-alkyl, whose carbon chain may be interrupted by oxygen atoms in ether function, or aryl, one of the radicals may in each case also be hydrogen, and R$^2$ and R$^3$ may also be joined together to form a 5- or 6-membered ring containing the nitrogen atom with or without further heteroatoms, Het$^e$ is the equivalent of a heteropolyacid anion, m is from 1 to 10, and n is 3 or 4.

2. Laked triscationic polymethine dyes of the formula I as claimed in claim 1, wherein the variables have the following meanings:

A is the radical of a fused-on benzene ring which may be substituted by chlorine, R is $C_1$–$C_4$-alkyl or phenyl, Z is —S—, —C(CH$_3$)$_2$— or —CH=CH—, D is —CH=CH—CH= or

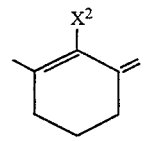

and where X$^2$ is chlorine or phenoxy or phenylthio which may each carry up to two of the following substituents: amino, chlorine, bromine, nitro, cyano, isocyanato, isothiocyanato, hydroxyl, carboxyl, acryloyloxy, methacryloyloxy, $C_1$–$C_6$-alkyl, $C_2$–$C_6$-alkenyl, $C_1$–$C_6$-alkoxy, $C_1$–$C_6$-alkanoyl, $C_1$–$C_6$-alkanoyloxy, $C_1$–$C_6$-alkoxycarbonyl, $C_1C_6$-alkoxycarbonyloxy, mono-($C_1$–$C_6$-alkyl)amino and/or di-($C_1$–$C_6$-alkyl)amino, wherein the carbon chain of the alkyl radicals may be interrupted by oxygen atoms in ether function and the alkyl radicals of the amino groups may be substituted by hydroxyl, Het$^e$ is the equivalent of a heteropolyacid anion based on molybdenum, tungsten and/or vanadium, m is from 3 to 6, and n is 3.

3. Laked polymethine dyes of the formula I as claimed in claim 1 wherein Het$^e$ is the anion of a molybdato-, vanadato- or tungsto-phosphoric acid, of a molybdato-, vanadato- or tungsto-silicic acid, or of a mixed acid thereof.

4. A method for pigmenting paints, printing inks and plastics which comprises incorporating therein the laked polymethine dyes of the formula I as claimed in claim 1.

5. Printing inks comprising one or more of the laked polymethine dyes of the formula I as claimed in claim 1.

* * * * *